United States Patent
Greenway et al.

(10) Patent No.: US 7,428,036 B2
(45) Date of Patent: Sep. 23, 2008

(54) LIQUID CRYSTAL SWITCHABLE COUPLER FOR COUPLING AT LEAST TWO UNPOLARIZED LIGHT INPUTS

(75) Inventors: Christopher Greenway, Caldicot (GB); Thomas J. Richards, Ashley Down (GB)

(73) Assignee: MBDA UK Limited, Stevenage, Hertfordshire (GB)

( * ) Notice: Subject to any disclaimer, the term of this patent is extended or adjusted under 35 U.S.C. 154(b) by 95 days.

(21) Appl. No.: 10/518,898

(22) PCT Filed: Oct. 8, 2004

(86) PCT No.: PCT/GB2004/004311

§ 371 (c)(1), (2), (4) Date: Dec. 22, 2004

(87) PCT Pub. No.: WO2005/040902

PCT Pub. Date: May 5, 2006

(65) Prior Publication Data

US 2006/0104567 A1    May 18, 2006

(30) Foreign Application Priority Data

Oct. 17, 2003   (GB)   ................................. 0324408.4

(51) Int. Cl.
  *G02F 1/13*   (2006.01)
(52) U.S. Cl. .................. 349/196; 359/315; 359/322
(58) Field of Classification Search .............. 349/196; 359/315, 322
See application file for complete search history.

(56) References Cited

U.S. PATENT DOCUMENTS 4,278,327 A    7/1981   McMahon et al.

(Continued)

FOREIGN PATENT DOCUMENTS

JP   56-46210   4/1981

(Continued)

OTHER PUBLICATIONS

R.A. Soref et al., "Total Switching of Unpolarized Fiber Light with a Four-Port Electro-Optic Liquid-Crystal Device", XP-002269463, Optics Letters, Apr. 1980, vol. 5, No. 4, pp. 147-149.

(Continued)

*Primary Examiner*—David C. Nelms
*Assistant Examiner*—Nathanael R Briggs
(74) *Attorney, Agent, or Firm*—Nixon & Vanderhye P.C.

(57) ABSTRACT

A switchable coupler (10) has a first waveguide (15) defining an inlet port (31) for a first unpolarized light input (A) and a first outlet port (32), and also a second waveguide (16) defining an inlet port (41) for a second unpolarized light input (13) and a second outlet port (42). Polarization splitter devices (11, 12) and two electro-optical switches (13,14) are sandwiched between the waveguides (15, 16). The polarization splitter devices (11, 12) are positioned to split the light inputs (A and B) into respective refracted and reflected polarized components ($A_L$ and $A_F$; $B_L$ and $B_F$), and the electro-optical switch (13) is operable by the application across it of a potential difference (+V) to recombine the polarized components ($B_L$, $B_F$) and to couple them with the light output $A_T$ through the first outlet port (32). As shown in FIG. (7), the electro-optical switch (14) is alternatively operable by the application across it of the potential difference (+V) to recombine the polarized components ($A_L$, $A_F$) and to couple them with the light output $B_T$ through the second outlet port (42).

6 Claims, 5 Drawing Sheets

U.S. PATENT DOCUMENTS

| | | | | |
|---|---|---|---|---|
| 4,784,470 A | * | 11/1988 | Baker | 349/197 |
| 4,813,771 A | * | 3/1989 | Handschy et al. | 349/196 |
| 5,132,822 A | * | 7/1992 | Buhrer | 349/197 |
| 6,559,921 B1 | | 5/2003 | Leslie et al. | |
| 6,563,973 B1 | | 5/2003 | Suggs et al. | |
| 6,863,973 B2 | * | 5/2003 | Caracci et al. | 385/17 |
| 2003/0142262 A1 | * | 7/2003 | Leslie et al. | 349/198 |

FOREIGN PATENT DOCUMENTS

JP  63-309932  12/1988

OTHER PUBLICATIONS

GB Search Report.
EP Search Report u.

* cited by examiner

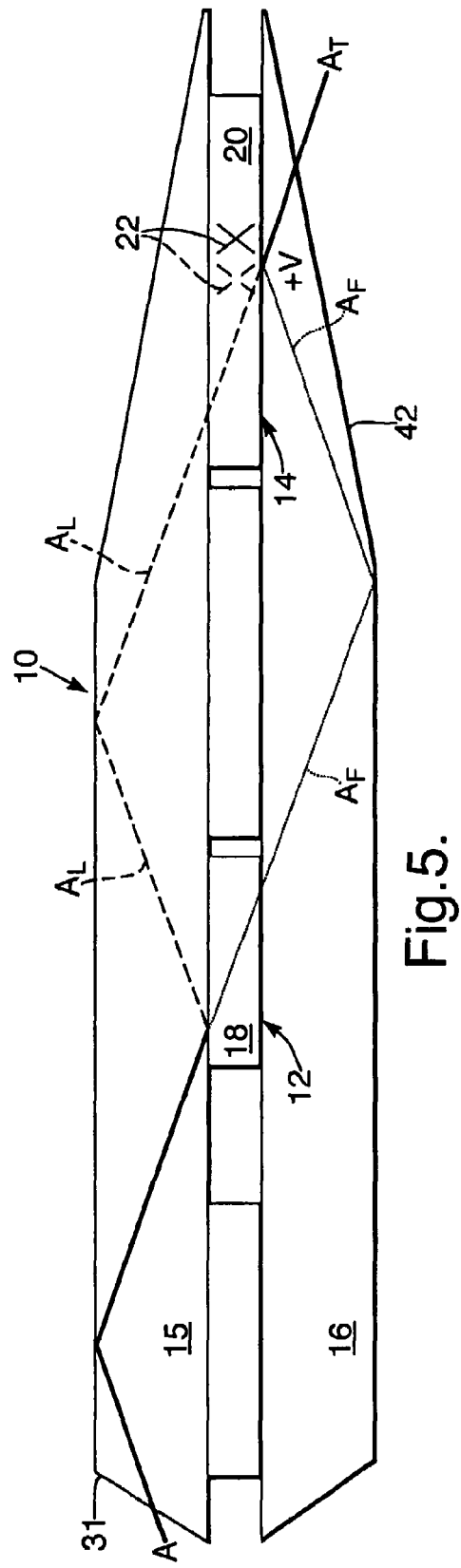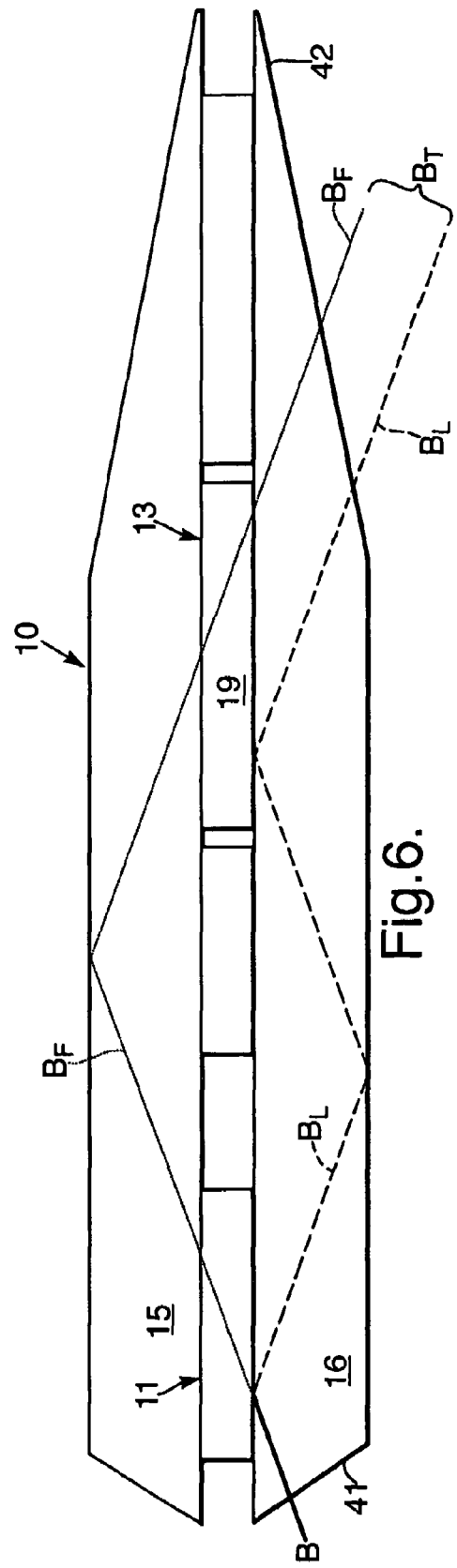

LIQUID CRYSTAL SWITCHABLE COUPLER FOR COUPLING AT LEAST TWO UNPOLARIZED LIGHT INPUTS

This application is the U.S. national phase of international application PCT/GB2004/004311 filed 8 Oct. 2004 which designated the U.S. and claims benefit of 0324408.4, dated 17 Oct. 2003, the entire content of which is hereby incorporated by reference.

This invention relates to the coupling of two unpolarized light inputs.

Throughout this specification and claims the word "light" is used to cover any form of electromagnetic-energy that can be transmitted within a waveguide.

Electro-optical switches are known which use the properties of a birefringent material, such as a liquid crystal layer, to switch unpolarized light from one multimode fibre to another. For instance, the April 1980 edition of OPTICS LETTERS, volume 5, number 4, pages 147-149, reports details of a high efficiency electro-optic liquid crystal device by R A Soref and D H McMahon of Sperry Research Centre, Sudbury, Mass., USA. This disclosure teaches that a novel double-pass structure can enable nearly 100% of unpolarized light signals to be exchanged between pairs of multimode fibres in response to electrical control voltages. However this proposal does not enable two unpolarized light inputs to be coupled, that is switched into the same outlet port.

Liquid crystal exists in a nematic phase where its molecules line up in a common direction but have no specific positional orientation. This molecular orientation gives rise to the liquid crystal medium being anisotropic in character, that is having material properties such as optical and electromagnetic characteristics, that are direction dependent.

One of its anisotropic properties is its refractive index which leads to a double refraction (or birefringent) characteristic. As a consequence, when unpolarized light is incident on the surface of liquid crystal, different refractive indices act on the two polarization components of the incident light. These polarization components are:

1. A component acting perpendicular to both the direction of propagation and the liquid crystal surface, and
2. A component normal to the first component but still acting perpendicular to the direction of travel.

The two refractive indices are termed the ordinary index $n_O$ and the extraordinary index $n_E$. If the refractive index of the waveguide medium adjoining the liquid crystal surface is $n_1$, then $n_1 >> n_O$ $n_1 \approx n_E$ (but slightly larger)

If the angle of incidence is greater than the critical angle due to $n_O$, but less than the critical angle due to $n_E$, one polarization component will be refracted through the liquid crystal whilst the other polarization component will be totally reflected. Due to this characteristic, liquid crystal can be used as a polarization splitter device which will split incident unpolarized light into refracted and reflected polarized components.

When an electric field is applied to a liquid crystal cell, the dipole nature of the molecules causes their rotational transition with the result that the values of the ordinary and the extraordinary refractive indices, relative to the incident ray, are exchanged. Consequently the previously refracted polarized component is reflected, and the previously reflected polarized component is refracted. Due to this characteristic, liquid crystal in conjunction with an electric field device is capable of switching two polarized lightrays.

The present invention is concerned with the provision of both an optical coupler and a method which enables the coupled unpolarized light inputs to be switched into the same outlet port.

According to one aspect of the invention, a switchable coupler has:
  a first waveguide defining
    an inlet port for a first unpolarized light input and
    a first outlet port,
  a second waveguide defining
    an inlet port for a second unpolarized light input and
    a second outlet port,
  a polarization splitter device positioned between the waveguides to split the first unpolarized light input and the second unpolarized light input into respective refracted and reflected polarized components,
  the waveguides being arranged to transmit
    the refracted and reflected polarized components of the first light input by total internal reflection in the direction of the first outlet port, and
    the refracted and reflected polarized components of the second light input by total internal reflection in the direction of the second outlet port,
  a first electro-optical switch positioned in the paths of the refracted and reflected polarized components of the first light input,
  the first electro-optical switch being operable to recombine the refracted and reflected polarized components of the first light input and to switch these combined components towards the second outlet port, and
  a second electro-optical switch positioned in the paths of the refracted and reflected polarized components of the second light input,
  the second electro-optical switch being operable to recombine the refracted and reflected polarized components of the second light input and to switch these combined components to the first outlet port.

In this manner the first unpolarized light input can alternatively be switched into the same outlet port as the second unpolarized light input. Thus the two unpolarized light inputs are coupled together and can also be switched between two outlet ports.

The polarization splitter device preferably includes liquid crystal positioned between the waveguides. In this case the liquid crystal may define two separate cells, one liquid crystal cell serving to split the first unpolarized light input, and the other liquid crystal cell serving to split the second unpolarized light input.

The, or each, electro-optical switch preferably includes liquid crystal positioned between the waveguides, and an electric field device is provided to generate an electric field across the liquid crystal to operate the electro-optical switch, or switches. In this case the liquid crystal preferably defines two separate cells, one of these liquid crystal cells forming part of each electro-optical switch.

According to another aspect of the invention, a method of coupling first and second inputs of unpolarized light comprises:
  splitting the first and second inputs into respective refracted and reflected polarized components,
  transmitting the refracted and reflected components of the first input to a first electro-optical switch operable to recombine the refracted and reflected components of the first input and to switch the recombined output from a first outlet to a second outlet, transmitting the refracted and reflected components of the second input to a second electro-optical switch operable to recombine the refracted and reflected components of the second input and to switch the recombined output from the second outlet to the first outlet, and selecting the operation of the first and second electro-optical switches to couple the first and second inputs into either the first outlet or the second outlet.

The invention will now be described, by way of example only, with reference to the accompanying drawings in which.

Figure 2:
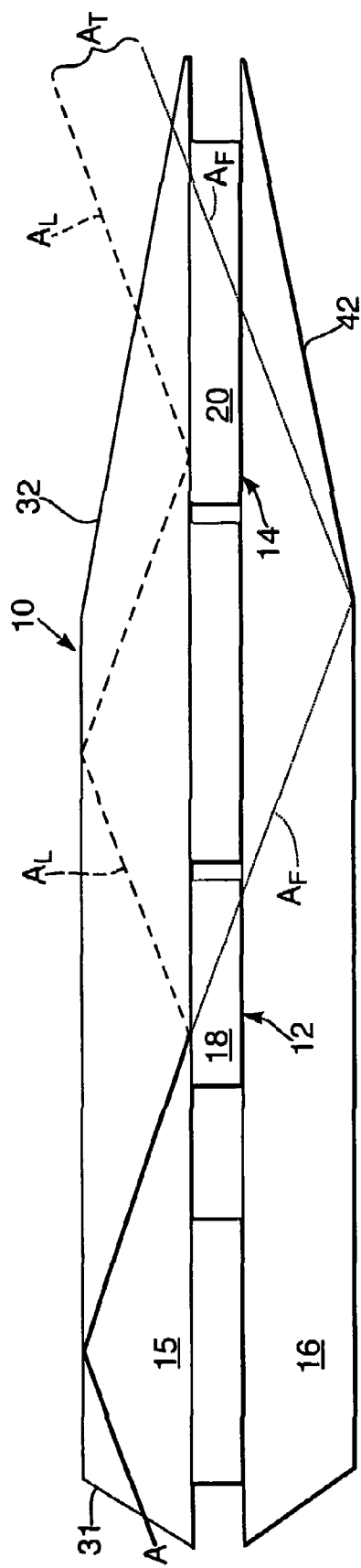
FIG. 2 is a diagram illustrating the ray passage of a first unpolarized light input to a first outlet port.
Figure 3:
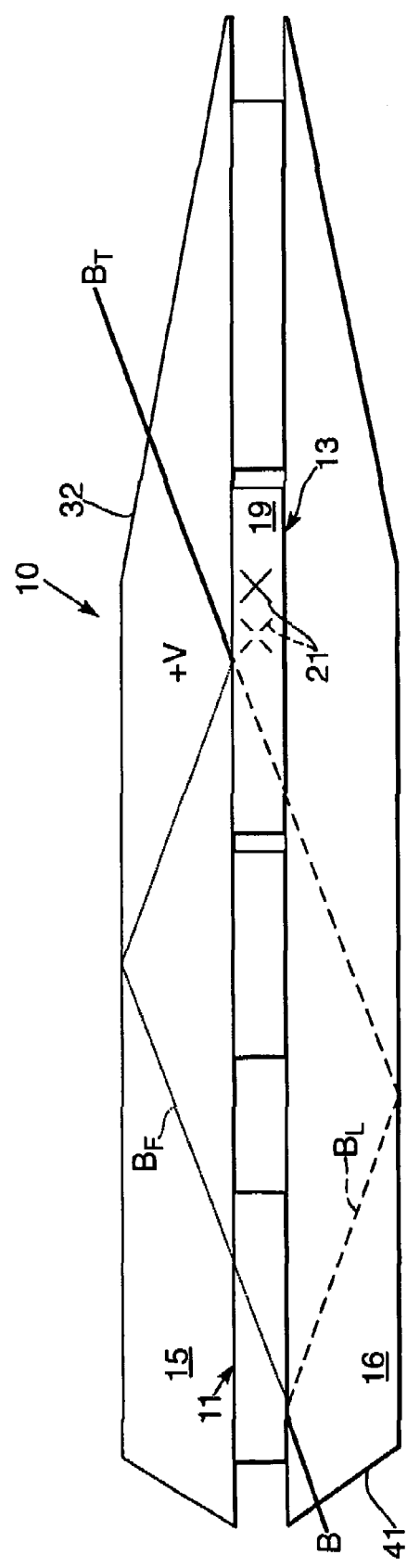
FIG. 3 is a diagram illustrating the ray passage of a second unpolarized light input to the first outlet port.
Figure 4:
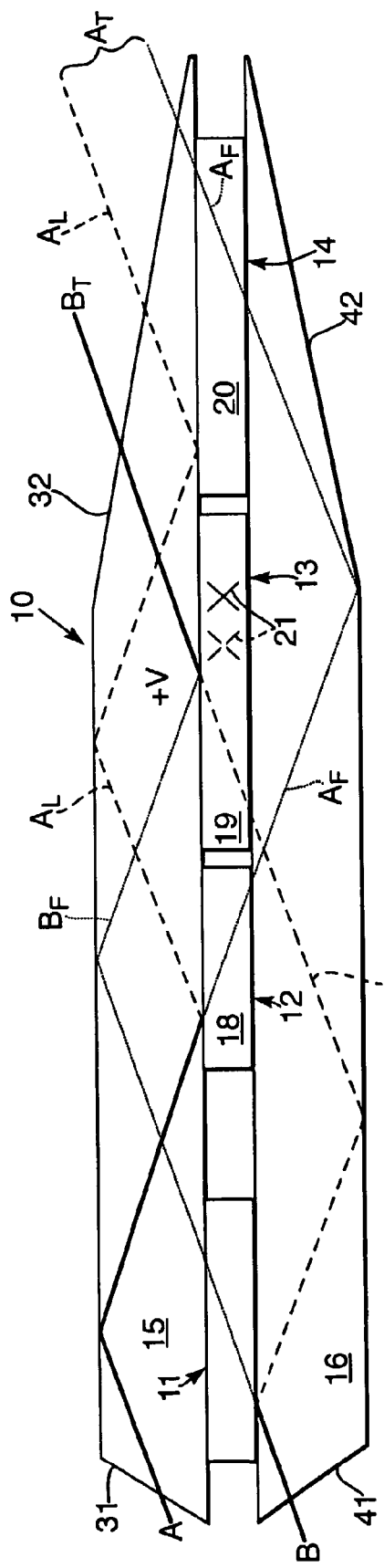
Figure 7:
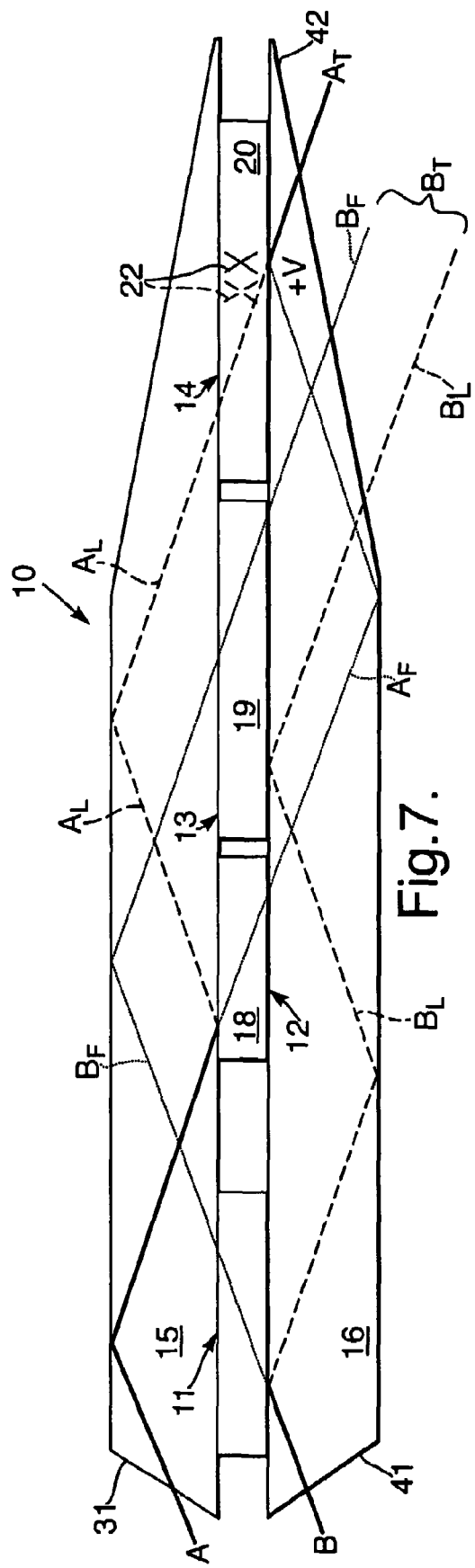

FIG. 4 combines the information shown in FIGS. 2 and 3 to illustrate how the first and second unpolarized light inputs are coupled into the first outlet port;

FIG. 5 is a diagram illustrating the ray passage of the first unpolarized light input to a second outlet port;

FIG. 6 is a diagram illustrating the ray passage of the second unpolarized light input to the second outlet port, and FIG. 7 combines the information shown in FIGS. 5 and 6 to illustrate how the first and second unpolarized light inputs are coupled into the second outlet port.

The same reference numerals are used throughout the drawings to denote equivalent features and only points of difference will be described.

Figure 1:
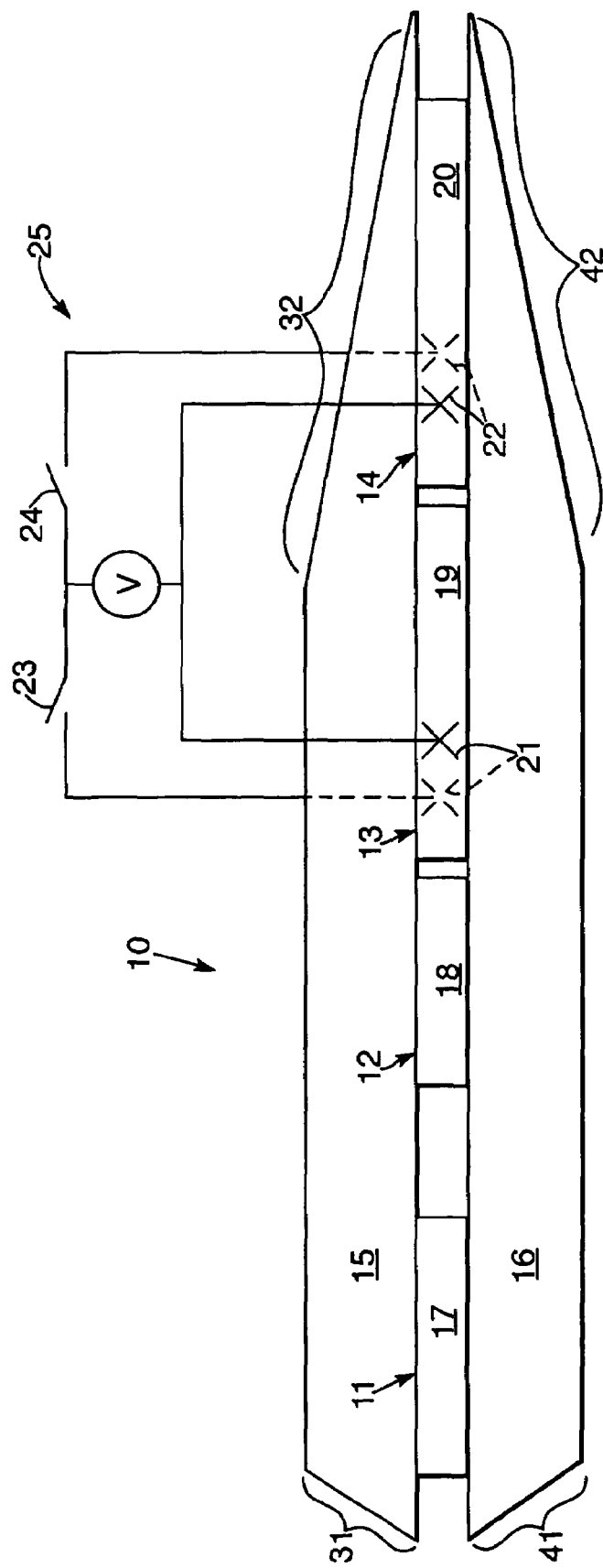
FIG. 1 is an enlarged side elevation of an optical coupler as taught by this invention.

With reference to FIG. 1, an optical coupler 10 comprises two polarization splitter devices 11 and 12, and two electro-optical switches 13 and 14, all sandwiched between an upper waveguide 15 and a lower waveguide 16. The adjectives "upper" and "lower" only refer to the relative positions of the waveguides 15 and 16 as shown in the drawings and do not imply any orientation of the optical coupler 10 which can operate in any orientation.

The polarization splitter devices 11, 12 are formed by respective liquid crystal cells 17 and 18 positioned between the waveguides 15 and 16 as shown.

The electro-optical switches 13, 14 are also formed by respective liquid crystal cells 19 and 20 positioned between the waveguides 15 and 16 as shown. The opposite sides of the liquid crystal cells 19 and 20 are provided with electrodes 21, 22 which can be selectively connected by closing respective switches 23, 24 to apply a potential difference V whereby an electric field can be applied to the selected electrodes 21 or 22 to operate the associated electro-optical switch 13 or 14. The electrodes 21, 22, the switches 23, 24 and the potential difference V constitute an electric field device 25 for generating an electric field through the liquid crystal cells 19 and/or 20 to cause the values of the ordinary refractive index and the extraordinary refractive index to be exchanged.

Upper waveguide 15 is formed from a glass core which defines an inlet port 31 for a first unpolarized light input and a light outlet port 32. The lower waveguide 16 is similarly formed from a glass core which defines an inlet port 41 for a second unpolarized light input and a light outlet port 42. In the drawings the construction of the waveguides 15 and 16 is simplified by only illustrating their glass cores. However, it will be understood that the waveguides 15 and 16 would be provided with the usual exterior cladding to promote complete total internal reflection, this cladding being omitted to define transparent windows for the inlet ports 31 and 41 and for the outlet ports 32 and 42. Similarly transparent windows will be left unclad above and below the liquid crystal cells 17, 18, 19 and 20 to permit light to pass between the waveguides 15 and 16 as will shortly be described. The glass, from which the waveguide cores are manufactured, has an appropriate refractive index relative to the liquid crystal material. The waveguide cores may be manufactured from other appropriate materials dependent on the wavelength of the electromagnetic radiation.

FIGS. 2 to 7 illustrate the passage of a first unpolarized light input A and a second unpolarized light input B through the waveguides 15 and 16, the unpolarized beams being shown by heavy full lines, reflected polarized beams being indicated by lighter dashed lines, and refracted polarized beams being indicated by lighter dotted lines.

In FIG. 2 the first unpolarized light input A is seen entering the inlet port 31 and being transmitted by complete total internal reflection within the upper waveguide 15 to impinge on the splitter device 12 where it is split into a refracted polarized component $A_F$ and a reflected polarized component $A_L$. The reflected component $A_L$ is transmitted within the upper waveguide 15 by total internal reflection to exit through outlet port 32, whilst the refracted polarized component $A_F$ passes through the liquid crystal cell 18 and is transmitted within the lower waveguide 16, by total internal reflection, to exit through outlet port 32, having passed through the liquid crystal cell 20. Thus the first unpolarized light input A is transmitted through the switchable coupler 10 to exit through the outlet port 32 as light output $A_T$ comprising the two polarized components $A_L$ and $A_F$ of the first unpolarized light input A.

In FIG. 3 the second unpolarized light input B is seen entering the inlet port 41 to impinge on the splitter device 11 where it is split into a refracted polarized component $B_F$ and a reflected polarized component $B_L$. The refracted polarized component $B_F$ is transmitted within the upper waveguide 15 by total internal reflection to impinge on the upper surface of the electro-optical switch 13, whilst the reflected polarized component $B_L$ is transmitted within the lower waveguide 16 by total internal reflection to join the refracted polarized component $B_F$, having passed through the liquid crystal cell 19. As shown, a potential difference V has been applied to the electrodes 21 causing the polarized components $B_F$ and $B_L$ to recombine and exit through outlet port 32 as light output $B_T$ which is identical with light input B FIG. 4 combines the information provided by FIGS. 2 and 3 and shows that the application of a potential difference V across the liquid crystal cell 19 operates the electro-optical switch 13 to cause the second light output $B_T$ to exit through outlet port 32 with the light output $A_T$. In this manner the two separate light inputs A and B have been coupled together to pass through the same outlet port 32.

In FIG. 5 the first unpolarized light input A is transmitted through the switchable coupler, as far as the liquid crystal cell 20, in exactly the same manner as already described with reference to FIG. 2. However the liquid crystal cell 20 has been activated by applying a potential difference V to the electrodes 22 to allow the reflected component $A_L$ to pass through the liquid crystal cell 20 and to cause the polarized components $A_L$ and $A_F$ to recombine and exit through the outlet port 42 as light output $A_T$ which is identical with light input B.

In FIG. 6 the second unpolarized light input B is transmitted through the switchable coupler 10, as far as the liquid crystal cell 19, in exactly the same manner as already described with reference to FIG. 3. However, no potential difference is applied to the liquid crystal cell 19 which reflects the reflected polarized component $B_L$ to exit through outlet port 42. The refracted polarized component $B_F$ passes through the liquid crystal cell 19 to exit through the same outlet port 42. In this manner the two polarized components $B_F$ and $B_L$ both exit the outlet port 42 as light output $B_T$.

FIG. 7 combines the information provided by FIGS. 5 and 6 and shows that the application of a potential difference V across the liquid crystal cell 20 operates the electro-optical switch 13 to cause the first light output $A_T$ to exit through outlet port 42 with the light output $B_T$. In this manner the two separate light inputs A and B have been coupled together to pass through the same outlet port 42.

From a comparison of FIGS. 2 and 5, it will be appreciated that, simply by applying the potential difference V to the terminals 22 of the electro-optical switch 14, the first unpolarized light input A can be switched from outlet port 32 to outlet port 42. Similarly a comparison of FIGS. 3 and 6 show that the application of potential difference V to the terminals 21 of the electro-optical switch 13 will switch the second unpolarized light output B from the outlet port 42 to the outlet port 32.

More importantly, from a comparison of FIGS. 4 and 7, it will be appreciated that the application of the potential difference V to operate either of the electro-optical switches 13 or 14 will couple the two unpolarized light inputs A and B together and will also control from which of the outlet ports 32 or 42 the coupled light outputs will exit.

This invention is particularly useful when applied to a fibre optic signal handling system in which the output intensity of the optical coupler 10 is the primary consideration.

In the drawings, the light outputs $A_T$ and $B_T$ are shown parallel but separated, their separation assisting the description of the various light paths. If desired, the configuration of the waveguides 15 and 16, and also the relative positions and the number and sizes of the liquid crystal cells 17, 18, 19 and 20 may be adjusted to minimise the separation of the light outputs $A_T$ and $B_T$.

If desired, other optical or electro-optical devices may be provided for recombining any polarized components of the light outputs $A_T$ and $B_T$, and/or for directing the light outputs $A_T$ and $B_T$.

The liquid crystal material has been shown as separate cells 17, 18, 19 and 20 to avoid any edge effects. However, if desired, any or all of the liquid crystal cells may be combined so that they are dedicated zones within a larger cell of liquid crystal, provided that their function is not disturbed by any edge effect.

The invention claimed is:

1. A switchable coupler comprising:
    a first optical waveguide defining an inlet port for a first unpolarized light input and a first outlet port,
    a second optical waveguide defining an inlet port for a second unpolarized light input and a second outlet port,
    a polarization splitter device positioned between said waveguides to split each of said first unpolarized light input and said second unpolarized light input into refracted and reflected polarized components,
    the waveguides being arranged, in the absence of activated first and second electro-optical switches, to transmit said refracted and reflected polarized components of said first light input by total internal reflection in the direction of said first outlet port, and the refracted and reflected polarized components of said second light input by total internal reflection in the direction of said second outlet port,
    a first electro-optical switch positioned in the paths of said refracted and reflected polarized components of said first light input, said first electro-optical switch for recombining said refracted and reflected polarized components of said first light input and, when activated, to switch these combined components towards said second outlet port, and
    a second electro-optical switch, positioned in the paths of said refracted and reflected polarized components of said second light input, for recombining said refracted and reflected polarized components of said second light input and, when activated, to switch these combined components to said first outlet port.

2. A switchable coupler, as in claim 1, in which said polarization splitter device includes liquid crystal positioned between said waveguides.

3. A switchable coupler, as in claim 2, in which said liquid crystal material defines two separate cells, one of said liquid crystal cells serving to split said first unpolarized light input, and the other of said liquid crystal cell serving to split said second unpolarized light input.

4. A switchable coupler, as in claim 1, in which at least one of said electro-optical switches includes liquid crystal positioned between said waveguides, and an electric field device is provided to generate an electric field across said liquid crystal to operate the electro-optical switch.

5. A switchable coupler, as in claim 4, in which said liquid crystal material defines two separate cells, and one of these liquid crystal cells forms part of each said electro-optical switch.

6. A method of coupling first and second inputs of unpolarized light comprising:
    splitting each of said first and second inputs into respective refracted and reflected polarized components,
    transmitting said refracted and reflected components of said first input to a first electro-optical switch for recombining said refracted and reflected components of said first input and to switch the recombined output from a first outlet to a second outlet,
    transmitting said refracted and reflected components of said second input to a second electro-optical switch for recombining said refracted and reflected components of said second input and to switch said recombined output from said second outlet to said first outlet, and
    selecting the operation of said first and second electro-optical switches to couple said first and second inputs into an outlet from the group comprising said first outlet and said second outlet.

* * * * *